United States Patent
Lee et al.

(10) Patent No.: US 12,050,533 B2
(45) Date of Patent: Jul. 30, 2024

(54) MEMORY SYSTEM AND OPERATING METHOD OF MEMORY SYSTEM

(71) Applicant: SK hynix Inc., Icheon-si (KR)

(72) Inventors: Kyu Min Lee, Icheon-si (KR); In Jong Jang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 357 days.

(21) Appl. No.: 17/547,047

(22) Filed: Dec. 9, 2021

(65) Prior Publication Data

US 2023/0039982 A1 Feb. 9, 2023

(30) Foreign Application Priority Data

Aug. 4, 2021 (KR) .................. 10-2021-0102498

(51) Int. Cl.
*G06F 11/10* (2006.01)
*G06F 8/65* (2018.01)
*G06F 12/0804* (2016.01)
*G06F 12/0875* (2016.01)

(52) U.S. Cl.
CPC ............ *G06F 12/0804* (2013.01); *G06F 8/65* (2013.01); *G06F 11/1004* (2013.01); *G06F 12/0875* (2013.01); *G06F 2212/452* (2013.01)

(58) Field of Classification Search
CPC ............. G06F 11/1004; G06F 12/0804; G06F 12/0875; G06F 8/65; G06F 2212/452
See application file for complete search history.

(56) References Cited

U.S. PATENT DOCUMENTS

| | | | | |
|---|---|---|---|---|
| 6,357,021 | B1 * | 3/2002 | Kitagawa | G06F 8/65 714/E11.135 |
| 8,868,796 | B1 * | 10/2014 | Wojcik | G06F 8/65 710/5 |
| 11,520,483 | B2 * | 12/2022 | Kang | G06F 3/0679 |

FOREIGN PATENT DOCUMENTS

KR 10-1959359 3/2019

* cited by examiner

*Primary Examiner* — Nadeem Iqbal
(74) *Attorney, Agent, or Firm* — Weaver Austin Villeneuve & Sampson LLP

(57) ABSTRACT

Embodiments of the present disclosure relate to a memory system and an operating method of the memory system. According to embodiments of the present disclosure, when updating a target firmware, a memory system may receive, from a host, a temporary firmware for increasing the size of a buffer from a preset first size to a second size equal to or greater than the size of the target firmware, may load and execute the temporary firmware into a processor, may receive the target firmware from the host and write the target firmware to the buffer, and may write the target firmware to the memory device.

16 Claims, 15 Drawing Sheets

MEMORY SYSTEM AND OPERATING METHOD OF MEMORY SYSTEM

CROSS-REFERENCE TO RELATED APPLICATION

The present application claims priority under 35 U.S.C. 119(a) to Korean patent application number 10-2021-0102498 filed on Aug. 4, 2021, which is incorporated herein by reference in its entirety.

TECHNICAL FIELD

The embodiments relate to a memory system and an operating method of the memory system.

BACKGROUND

A memory system includes a data storage device that stores data on the basis of a request from a host, such as a computer, servers, a smartphone, a tablet PC, or other electronic devices. The examples of the memory system span from a traditional magnetic-disk-based hard disk drive (HDD) to a semiconductor-based data storage device such as a solid state drive (SSD), a universal flash storage device (UFS), or an embedded MMC (eMMC) device.

The memory system may further include a memory controller for controlling the memory device. The memory controller may receive a command from the host and, on the basis of the received command, may execute the command or control read/write/erase operations on the memory devices in the memory system. The memory controller may be used to execute firmware operations for performing a logical operation for controlling such operations.

A memory system may, when updating the firmware, write directly to the memory device without using a buffer for temporarily storing the firmware in order to shorten the time required for production of the memory system. In this case, there may occur an error in the firmware stored in the memory system.

SUMMARY

Embodiments of the disclosure may provide a memory system and an operating method of the memory system capable of preventing a problem in which the memory system is provided to the customer in a state with an error in the firmware that occurred when executing a firmware update.

In addition, embodiments of the disclosure may provide a memory system and an operating method of the memory system capable of enabling fast firmware update by performing a firmware update that is simpler than the process of updating firmware using a separate initialization firmware.

In one aspect, embodiments of the disclosure may provide a memory system including a memory device having a plurality of memory blocks, and a memory controller for controlling the memory device.

The memory controller may include a buffer for temporarily storing data to be written to the memory device and a processor for executing a target firmware to control the memory device.

The memory controller may receive, when updating the target firmware, a temporary firmware for increasing the size of the buffer from a preset first size to a second size equal to or greater than the size of the target firmware from a host, and may load and execute the temporary firmware into the processor.

The memory controller may receive the target firmware from the host and write the target firmware to the buffer.

The memory controller may write the target firmware to the memory device.

In another aspect, embodiments of the disclosure may provide an operating method of a memory system including a memory device including a plurality of memory blocks.

The operating method of the memory system may include receiving, when updating a target firmware, a temporary firmware for increasing the size of a buffer for temporarily storing data to be written to the memory device from a preset first size to a second size equal to or greater than the size of the target firmware from a host.

The operating method of the memory system may include loading and executing the temporary firmware into a processor included in the memory system.

The operating method of the memory system may include receiving the target firmware from the host and writing the target firmware to the buffer.

The operating method of the memory system may include writing the target firmware to the memory device.

According to embodiments of the present disclosure, it is possible to prevent a problem in which the memory system is provided to the customer in a state with an error in the firmware that occurred when executing a firmware update In addition, according to embodiments of the present disclosure, it is possible to enable fast firmware update by performing a firmware update that is simpler than the process of updating firmware using a separate initialization firmware.

DETAILED DESCRIPTION

Figure 1:
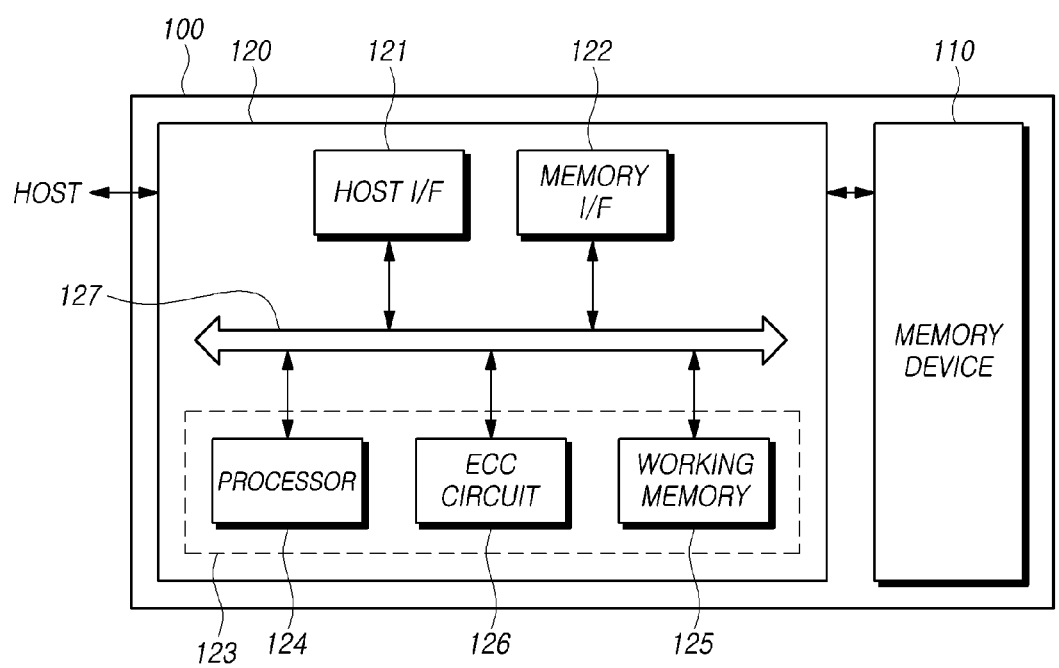
FIG. 1 is a schematic diagram illustrating a configuration of a memory system based on an embodiment of the disclosed technology.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. We note, however, that the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented in at least partially in software, the controllers, processors, devices, modules, units, multiplexers, generators, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 is a diagram illustrating the schematic configuration of a memory system 100 based on an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface 122, a control circuit 123, and a host interface 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host request to a physical address of the memory device 110, a host interface layer (HIL) configured to interpret a command that the host issued to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In some embodiments, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check as to whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
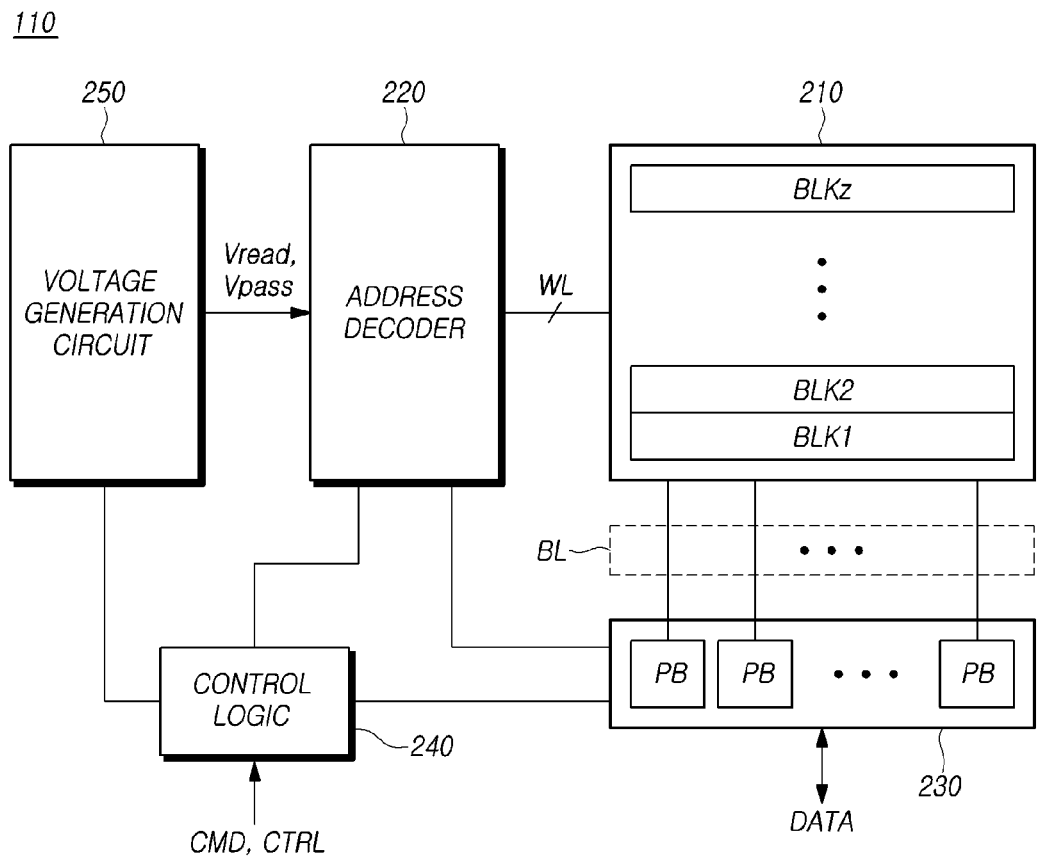
FIG. 2 is a block diagram schematically illustrating a memory device based on an embodiment of the disclosed technology.

FIG. 2 is a block diagram schematically illustrating a memory device 110 based on an embodiment of the disclosed technology.

In some implementations, the memory device 110 based on an embodiment of the disclosed technology may include a memory cell array 210, an address decoder 220, a read/write circuit 230, a control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block BLK included in the memory device 110 may include multiple pages PG. In some implementations, a plurality of memory cells arranged in columns form memory cell strings, and a plurality of memory cells arranged in rows form memory blocks. Each of the multiple pages PG is coupled to one of word lines WL, and each of the memory cell strings STR is coupled to one of bit lines BL.

In the memory block BLK, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells MC. In some implementations, each memory cell MC may include a transistor TR that includes a layer having a material that can hold an electrical charge.

For example, the transistor TR arranged in each memory cell MC may include a drain, a source, and a gate. The drain (or source) of the transistor TR may be connected to the corresponding bit line BL directly or via another transistor. The source (or drain) of the transistor TR may be connected to the source line (which may be the ground) directly or via another transistor. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

Figure 3:
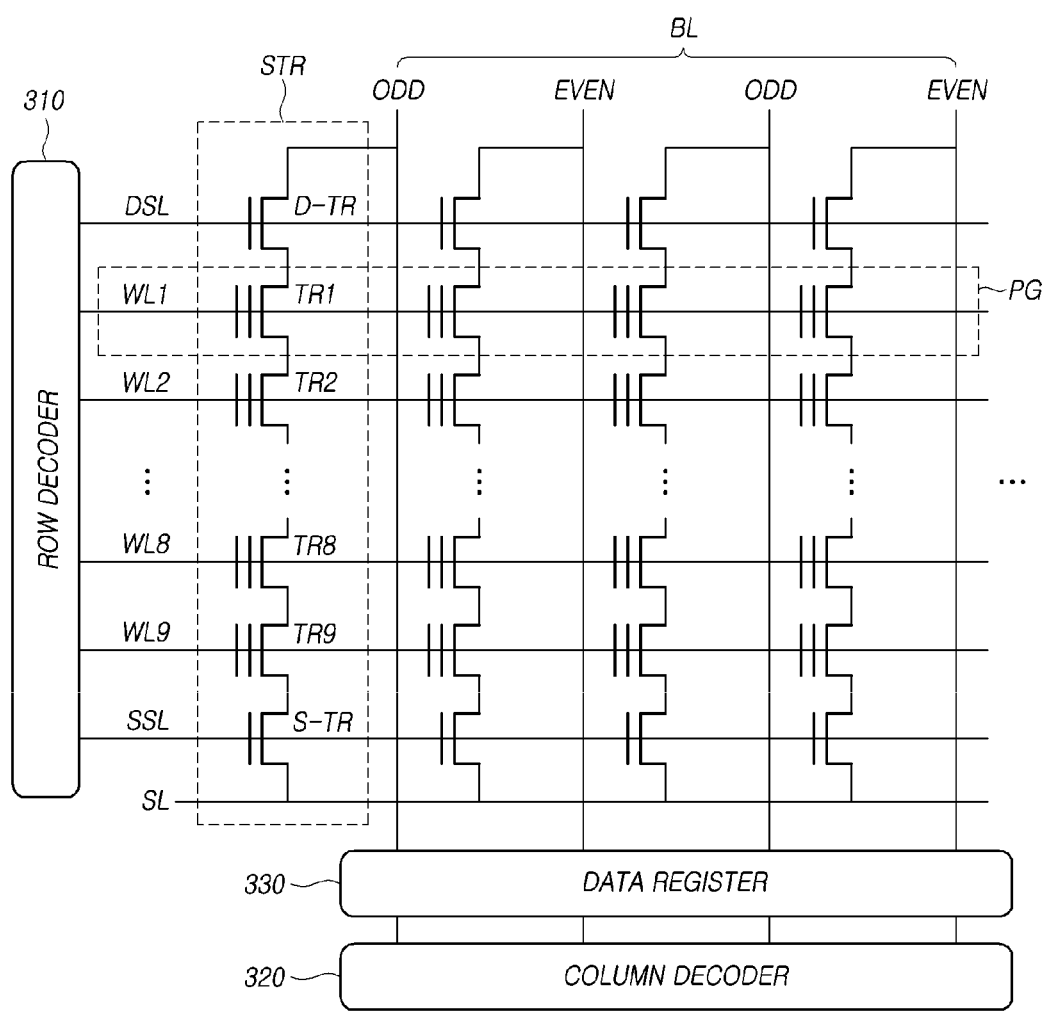
FIG. 3 illustrates a structure of word lines and bit lines of a memory device based on an embodiment of the disclosed technology.

FIG. 3 is a diagram illustrating a structure of word lines WL and bit lines BL of a memory device (e.g., memory device 110) based on an embodiment of the disclosed technology.

Referring to FIG. 3, the memory device has a core area in which memory cells MC are arranged, and an auxiliary area (the remaining area other than the core area) to include circuitry that is used to perform the operations of the memory cell array (e.g., memory cell array 210).

In the core area, a certain number of memory cells arranged in one direction can be called "page" PG, and a certain number of memory cells that are coupled in series can be called "memory cell string" STR.

The word lines WL1-WL9 may be connected to a row decoder 310. The bit lines BL may be connected to a column decoder 320. A data register 330, which may correspond to the read/write circuit 230 of FIG. 2, may exist between the multiple bit lines BL and the column decoder 320.

The multiple word lines WL1-WL9 may correspond to multiple pages PG.

For example, each of the multiple word lines WL1-WL9 may correspond to one page PG as illustrated in FIG. 3. When each of the multiple word lines WL1-WL9 has a large size, each of the multiple word lines WL1-WL9 may correspond to at least two (e.g., two or four) pages PG. Each page PG is the smallest unit in a program operation and a read operation, and all memory cells MC within the same page PG may perform simultaneous operations when conducting a program operation and a read operation.

The multiple bit lines BL may be connected to the column decoder 320. In some implementations, the multiple bit lines BL may be divided into odd-numbered bit lines BL and even-numbered bit lines BL such that a pair of odd-numbered bit line and even-numbered bit line is coupled in common to a column decoder 320.

In accessing a memory cell MC, the row decoder 310 and the column decoder 320 are used to locate a desired memory cell based on the address.

In some implementations, all data processing performed by the memory device 110, including program and read operations, may occur via the data register 330. If data processing by the data register 330 is delayed, some or all of the other areas may need to wait until the data register 330 finishes the data processing, degrading the overall performance of the memory device 110.

Referring to the example illustrated in FIG. 3, in one memory cell string STR, multiple transistors TR1-TR9 may be connected to multiple word lines WL1-WL9, respectively. In some implementations, the multiple transistors TR1-TR9 correspond to memory cells MC. In this example, the multiple transistors TR1-TR9 include control gates CG and floating gates FG.

The multiple word lines WL1-WL9 include two outermost word lines WL1 and WL9. A first selection line DSL may be additionally arranged outside the first outermost word line WL1, which is closer to the data register 330 and has a shorter signal path compared to the other outermost word line WL9. A second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR is used as a switch circuit that connects the corresponding memory cell string STR to the data register 330. The second selection transistor S-TR is used as a switch that connects the corresponding memory cell string STR to the source line SL. That is, the first selection transistor D-TR and the second selection transistor S-TR can be used to enable or disable the corresponding memory cell string STR.

In some implementations, the memory system 100 applies a predetermined turn-on voltage Vcc to the gate electrode of the first selection transistor D-TR, thereby turning on the first selection transistor D-TR, and applies a predetermined turn-off voltage (e.g., 0V) to the gate electrode of the second selection transistor S-TR, thereby turning off the second selection transistor S-TR.

The memory system 100 turns on both of the first and second selection transistors D-TR and S-TR during a read operation or a verification operation. Accordingly, during a read operation or a verification operation, an electric current may flow through the corresponding memory cell string STR and drain to the source line SL, which corresponds to the ground, such that the voltage level of the bit line BL can be measured. However, during a read operation, there may be a time difference in the on/off timing between the first selection transistor D-TR and the second selection transistor S-TR.

The memory system 100 may apply a predetermined voltage (e.g., +20V) to the substrate through a source line SL during an erasure operation. The memory system 100 applies a certain voltage to allow both the first selection transistor D-TR and the second selection transistor S-TR to float during an erasure operation. As a result, the applied erasure voltage can remove electrical charges from the floating gates FG of the selected memory cells.

Figure 4:
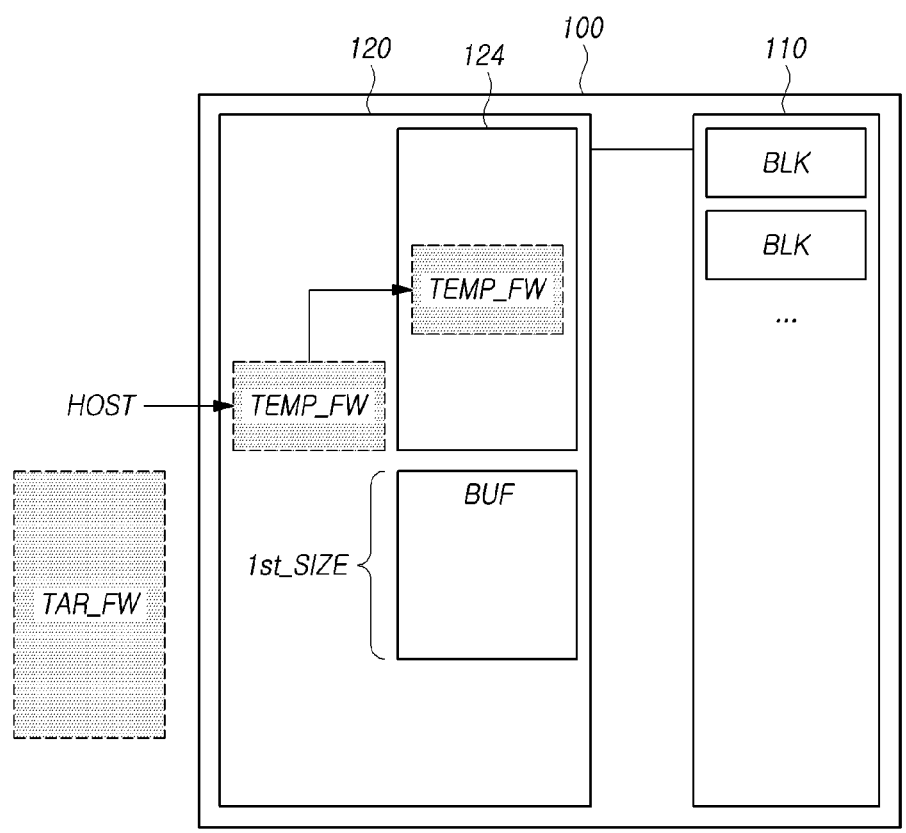
FIG. 4 illustrates an operation in which a memory system receives and executes temporary firmware from a host according to embodiments of the present disclosure.

FIG. 4 illustrates an operation in which a memory system 100 receives and executes temporary firmware TEMP_FW from a host according to embodiments of the present disclosure.

Referring to FIG. 4, a memory system 100 may include a memory device 110 and a memory controller 120. In this case, the memory device 110 may include a plurality of memory blocks BLK.

Referring to FIG. 4, when updating a target firmware TAR_FW, the memory controller 120 of the memory system 100 may receive, from the host HOST, a temporary firmware TEMP_FW for increasing the size of a buffer BUF from a preset first size 1st_SIZE to a second size 2nd_SIZE greater than or equal to the size of a target firmware TAR_FW. The temporary firmware TEMP_FW may be a separate firmware used to store the target firmware TAR_FW in the buffer BUF.

The memory controller 120 may load and execute the temporary firmware TEMP_FW into a processor 124. In this case, as an example, the memory controller 120 may simultaneously load the entire temporary firmware TEMP_FW into the processor 124. As another example, the memory controller 120 may load only a portion necessary to execute the temporary firmware TEMP_FW at a specific point in time among a plurality of codes included in the temporary firmware TEMP_FW into the processor 124. In other words, the temporary firmware TEMP_FW can be loaded into the processor 124 and be executed in a piecemeal manner.

The buffer BUF is an area capable of temporarily storing data to be written to the memory device 110. For example, the buffer BUF may be located on the working memory (e.g., working memory 125) or on a separate volatile memory (e.g., SRAM, SDRAM, or TCM). The memory controller 120 may dynamically change the size of the buffer BUF by executing the temporary firmware TEMP_FW.

When executing the temporary firmware TEMP_FW, the memory system 100 may communicate with the host through a preset interface. In this case, the interface may be implemented by a small computer system interface (SCSI), a serial ATA (SATA), or a serial attached SCSI (SAS), but is not limited thereto.

For example, in the case that a small computer system interface (SCSI) is used for the interface between the memory system 100 and the host, a write buffer command (WRITE BUFFER SCSI CMD) among small computer system interface commands (SCSI CMD) can be used.

The write buffer command (WRITE BUFFER SCSI CMD) may provide a plurality of modes, including a data mode for storing specific data in a buffer. The host may transmit, to the memory controller 120, a write buffer command (WRITE BUFFER SCSI CMD) set as a mode for executing firmware among a plurality of modes.

The memory controller 120 may receive the write buffer command (WRITE BUFFER SCSI CMD) for executing the temporary firmware TEMP_FW from the host, and execute the temporary firmware TEMP_FW in the processor 124.

Figure 5:
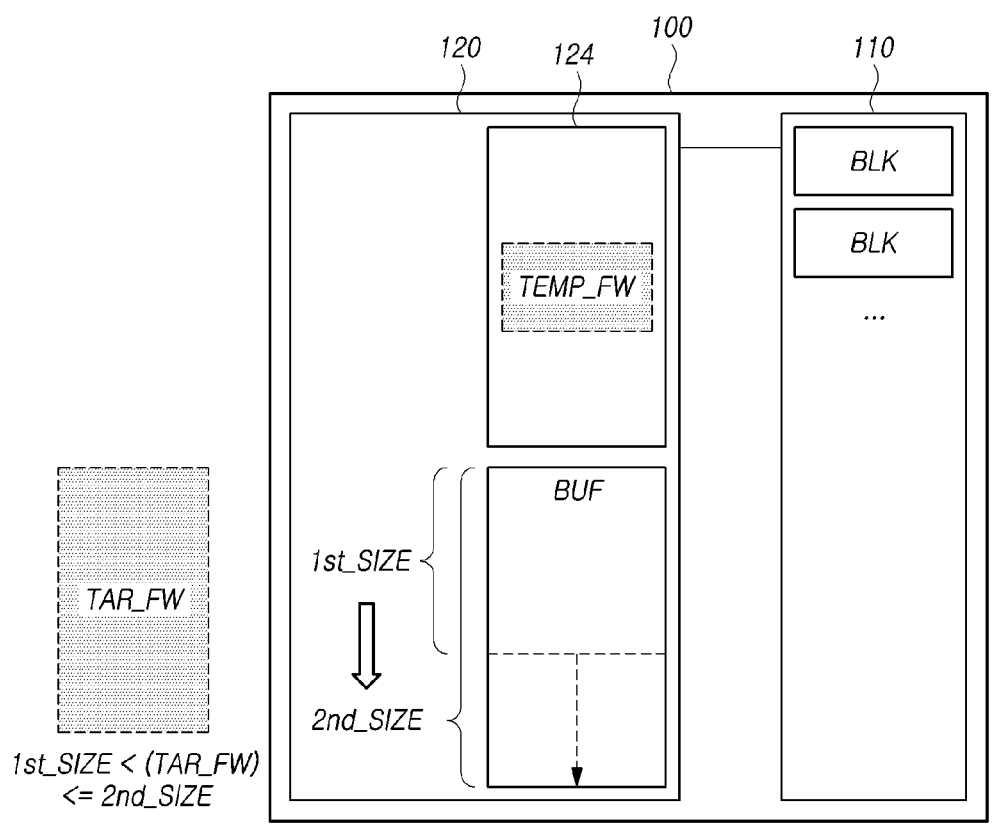
FIG. 5 illustrates an operation in which a memory system sets a buffer to a second size according to embodiments of the present disclosure.

FIG. 5 illustrates an operation in which a memory system 100 sets a buffer BUF to a second size 2nd_SIZE according to embodiments of the present disclosure.

Referring to FIG. 5, the memory controller 120 of the memory system 100 may increase the size of the buffer BUF from a first size 1st_SIZE to a second size 2nd_SIZE by executing the temporary firmware TEMP_FW. In this case, the size of the target firmware TAR_FW may be greater than the first size 1st_SIZE and smaller than or equal to the second size 2nd_SIZE. That is, the memory controller 120 may secure a space in the buffer BUF so that the target firmware TAR_FW can be stored in the buffer BUF by executing the temporary firmware TEMP_FW.

When setting the second size 2nd_SIZE to store the target firmware TAR_FW, the memory controller 120 may determine the second size 2nd_SIZE according to the size of the target firmware TAR_FW. For example, the second size 2nd_SIZE may be determined to be greater than or equal to the size of the target firmware TAR_FW. Meanwhile, the memory controller 120 may change the location of the buffer BUF while changing the size of the buffer BUF.

Meanwhile, as described above, in the case that the buffer BUF is located on a memory area including the working memory (e.g., working memory 125), a part of a memory area including the working memory can be additionally allocated to the buffer BUF in order to set the size of the buffer BUF to the second size 2nd_SIZE.

Figure 6:
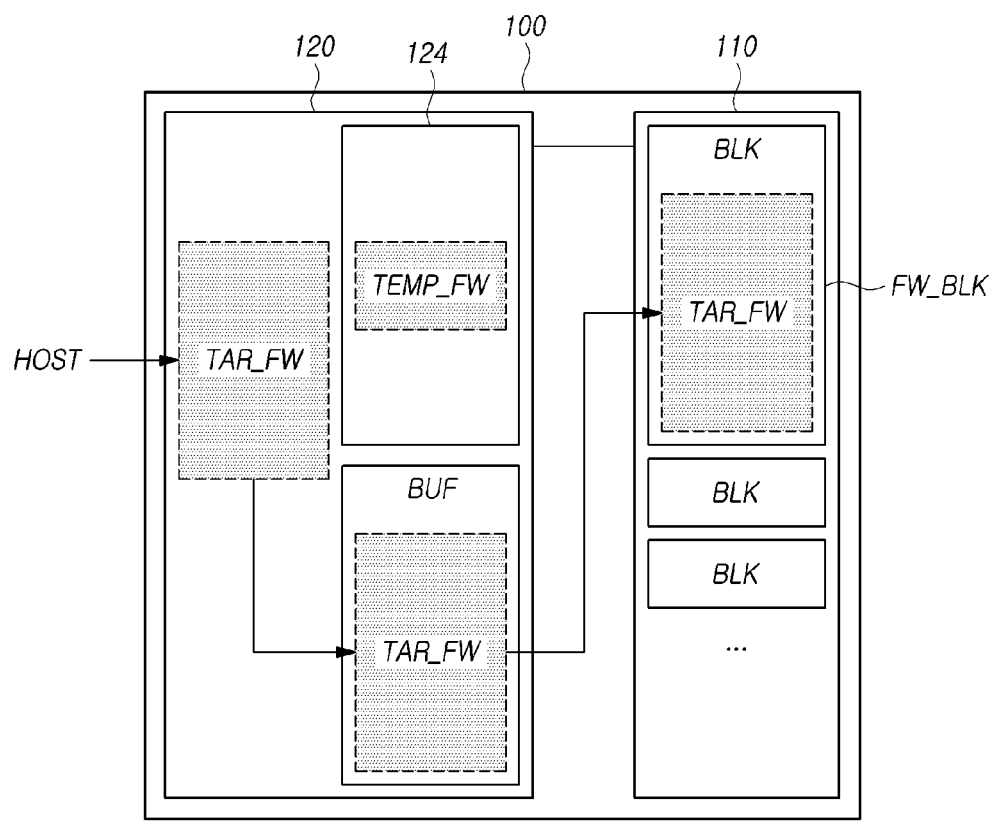
FIG. 6 illustrates an operation in which a memory system writes a target firmware to a memory device according to embodiments of the present disclosure.

FIG. 6 illustrates an operation in which a memory system 100 writes a target firmware TAR_FW to a memory device 110 according to embodiments of the present disclosure.

Referring to FIG. 6, the memory controller 120 of the memory system 100 may receive the target firmware TAR_FW from the host HOST and write it to the buffer BUF, and may write the target firmware TAR_FW written in the buffer BUF to the memory device 110.

The target firmware TAR_FW is written to the buffer BUF, so that the memory controller 120 may temporarily store the target firmware TAR_FW before writing the target firmware TAR_FW to the memory device 110. One reason for the memory controller 120 to temporarily store the target firmware TAR_FW in the buffer BUF is described below.

If the memory controller 120 writes the target firmware TAR_FW directly to the memory device 110 without using the buffer BUF, the memory controller 120 cannot detect an error such as a bit-flip that may occur in the process of writing to the memory device 110.

On the other hand, in the case that the memory controller 120 temporarily stores the target firmware TAR_FW in the buffer BUF and then writes the target firmware TAR_FW stored in the buffer BUF to the memory device 110, the memory controller 120 may detect and correct an error occurring in the target firmware TAR_FW written to the buffer BUF using a separate hardware device or software module.

The memory controller 120 may refer to data of the target firmware TAR_FW temporarily stored in the buffer BUF in order to detect or correct an error such as a bit-flip occurring in the process of writing the target firmware TAR_FW to the memory device 110. The memory controller 120 may prevent production with a bit-flip occurring in the target firmware TAR_FW written to the memory device 110 by detecting and correcting an error occurring in the memory device 110.

In this case, for example, when the memory controller 120 writes the target firmware TAR_FW to the memory device 110, the memory controller 120 may write to a firmware block FW_BLK that is one of the plurality of memory blocks BLK included in the memory device 110. The firmware block FW_BLK is a memory block capable of storing firmware.

Meanwhile, the location of the firmware block FW_BLK may be fixed to a preset location in the memory device 110. In this case, the memory controller 120 may access the firmware block FW_BLK at a preset location when loading the firmware into the processor 124 for execution.

Figure 7:
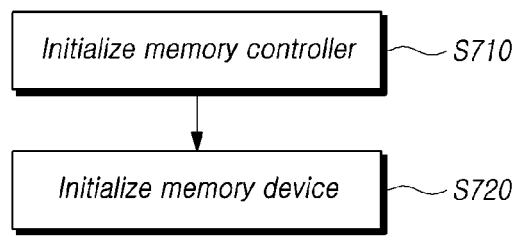
FIG. 7 is a flowchart illustrating an operation in which a memory system initializes a memory system by executing target firmware according to embodiments of the present disclosure.

FIG. 7 is a flowchart illustrating an operation in which a memory system 100 initializes a memory system 100 by executing target firmware according to embodiments of the present disclosure.

Referring to FIG. 7, the memory controller 120 of the memory system 100 may execute the target firmware TAR_FW written in the memory device 110 on the processor 124 and initialize the memory system 100. The memory controller 120 may initialize the memory controller 120 first (S710), and then the memory controller 120 may initialize the memory device 110 (S720).

The memory controller 120 may receive, from the host, a write buffer command (WRITE BUFFER SCSI CMD) containing an instruction to write the target firmware TAR_FW to the memory device 110 and execute the target firmware on the processor.

The memory controller 120 may load the target firmware TAR_FW written in the firmware block FW_BLK into the processor 124 and execute the target firmware. The processor 124 may control the memory controller 120 to perform various operations including initialization of the memory system 100 by executing the target firmware TAR_FW.

The initialization of the memory controller 120 may be performed by applying initial values set inside the memory controller 120. As an example, adjustment values in the memory controller 120 including data strobe (DQS) and low-dropout (LDO) adjustment values may be set to preset initial values. For example, the initial value may be stored as one time program (OTP) information in an eFuse.

The initialization of the memory device 110 may be performed by a method of initializing data written to the memory device 110. In the initialization process of the memory device 110, the memory controller 120 may delete data stored in the remaining memory blocks except for the memory block in which the target firmware TAR_FW is written. In this case, the target firmware TAR_FW may be stored in the memory device 110 even after the initialization operation of the memory device 110 is executed.

Figure 8:
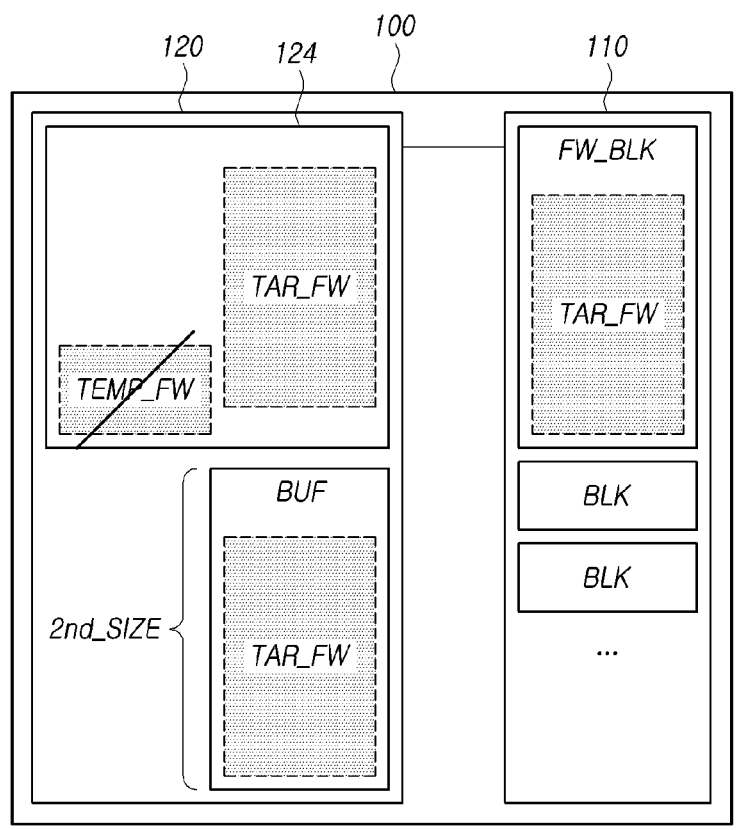
FIG. 8 illustrates an operation of deleting a temporary firmware by a memory system according to embodiments of the present disclosure.

FIG. 8 is a flowchart illustrating an operation of deleting a temporary firmware TEMP_FW by a memory system 100 according to embodiments of the present disclosure.

Referring to FIG. 8, the memory controller 120 of the memory system 100 may delete a temporary firmware TEMP_FW when loading and executing a target firmware TAR_FW into the processor. In some implementations, the temporary firmware TEMP_FW can be deleted after increasing the buffer size. In some implementations, the temporary firmware TEMP_FW can be deleted once the target firmware TAR_FW has been loaded into the processor. For example, the temporary firmware TEMP_FW can be deleted by executing code in the target firmware TAR_FW, or the temporary firmware TEMP_FW may include self-deleting code that is executed before passing control to the target firmware TAR_FW.

The temporary firmware TEMP_FW is a firmware that is temporarily executed to increase the size of the buffer BUF so that the target firmware TAR_FW can be stored in the buffer BUF. The temporary firmware may be deleted without being written to the memory device 110.

Since the temporary firmware TEMP_FW is deleted without being written to the memory device 110, the temporary firmware does not affect the memory device 110 until the memory controller 120 writes the target firmware TAR_FW to the memory device 110.

If the firmware is updated without increasing the size of the buffer, a separate firmware is required to be updated for initialization of the memory system 100. If a firmware for initialization is used, the initialization firmware has to be written to the memory device 110 and then be executed separately before updating a user firmware.

On the other hand, in the case that the temporary firmware TEMP_FW is used as in the present embodiment, there is no need to update a separate firmware for initialization of the memory system 100 and write to the memory device 110. Therefore, if the temporary firmware TEMP_FW is used, the firmware update can be executed faster.

Figure 9:
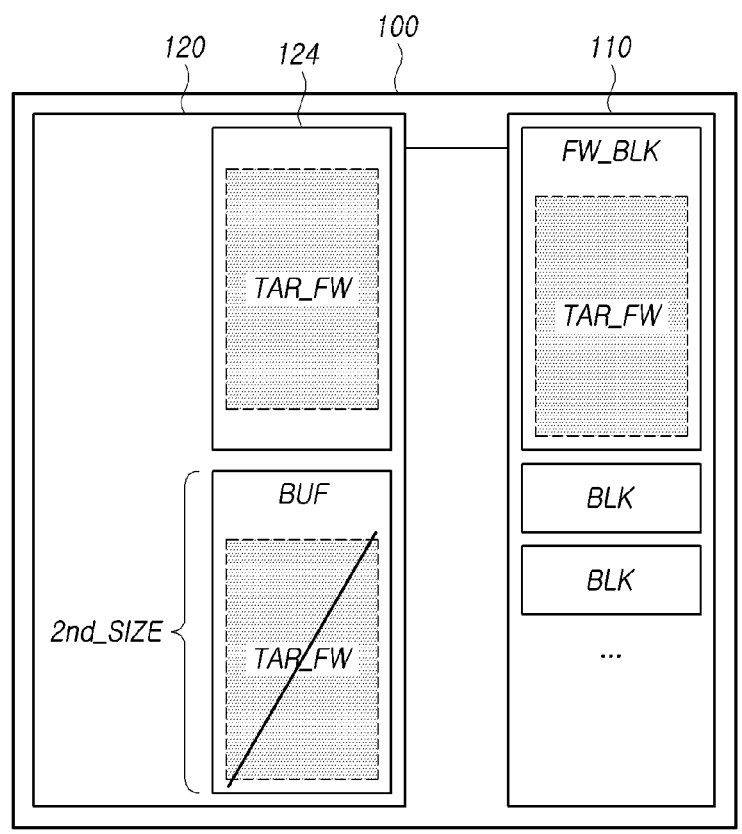
FIG. 9 illustrates an operation of deleting data written in a buffer by a memory system according to embodiments of the present disclosure.

FIG. 9 illustrates an operation of deleting data written in a buffer BUF by a memory system 100 according to embodiments of the present disclosure.

Referring to FIG. 9, the memory controller 120 of the memory system 100 may delete data written in the buffer BUF.

The memory controller 120 may temporarily store the target firmware TAR_FW in the buffer BUF in order to write the target firmware TAR_FW to the memory device 110.

In the case that a processor 124 normally executes the target firmware TAR_FW without an error, the memory controller 120 may determine that the update of the target firmware TAR_FW is successful. Accordingly, since the target firmware TAR_FW no longer needs to be maintained in the buffer BUF, it may be deleted from the buffer BUF.

Figure 10:
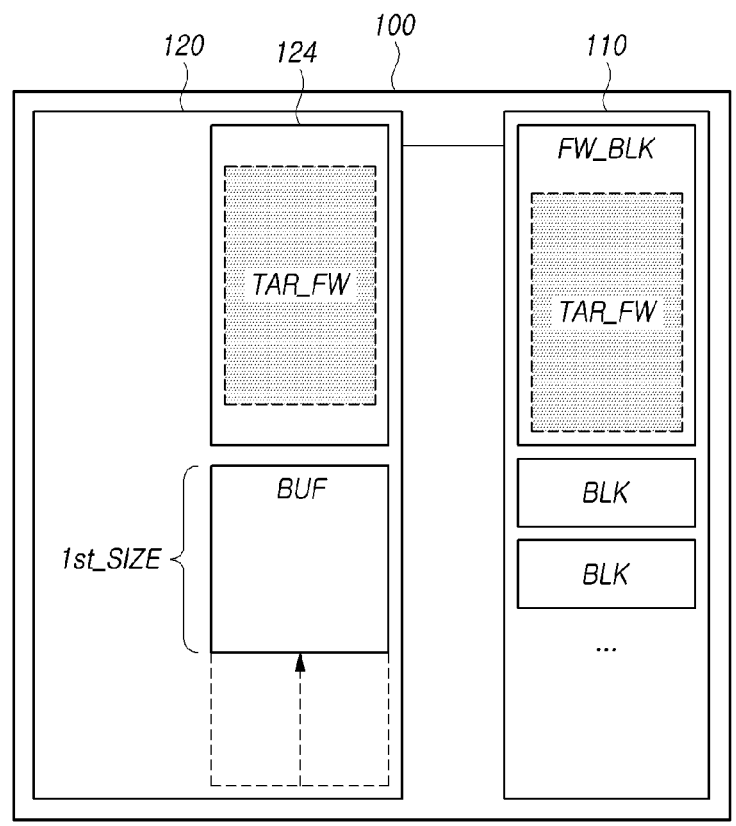
FIG. 10 illustrates an operation in which a memory system sets a buffer to a first size according to embodiments of the present disclosure.

FIG. 10 illustrates an operation in which a memory system sets a buffer BUF to a first size 1st_SIZE according to embodiments of the present disclosure.

Referring to FIG. 10, the memory controller 120 of the memory system 100 may set the size of the buffer BUF to a first size 1st_SIZE.

The buffer BUF is temporarily set to a second size 2nd_SIZE to store the target firmware TAR_FW. After writing the target firmware TAR_FW to the firmware block FW_BLK, the memory controller 120 may reset the size of the buffer BUF to the previous size of the first size 1st_SIZE.

Meanwhile, if it is required to increase the size of the buffer BUF when executing other operations as well as the operation of updating the target firmware TAR_FW (by applying the principle of increasing the size of the buffer BUF of the temporary firmware TEMP_FW) the memory controller 120 may temporarily allocate a memory area to the buffer BUF to increase its size, or may change the location by moving the memory area allocated to the buffer BUF.

In embodiments of the present disclosure, when writing the target firmware TAR_FW to the memory device 110, the memory controller 120 of the memory system 100 may detect and correct an error occurring in the target firmware TAR_FW written to the buffer BUF.

As an example, the buffer BUF may have an error detection and correction function at a hardware level. For example, the memory controller 120 may, independently of the error detection and correction circuit 126 described above, generate and write parity data for the memory area including the buffer BUF, when writing data to the buffer BUF. The parity of the data from the buffer BUF can be checked, and an error detection and correction operation can be executed to protect the physical layer.

As an example, the memory controller 120 may perform a Hamming code as a method of protecting the physical layer, or may add a parity bit to perform a single-error correction double-error detection (SECDEC), etc.

The memory controller 120 may prevent an error from occurring when data including the target firmware TAR_FW is stored in the buffer BUF by using a protection method of adding a parity bit. Hereinafter, this will be described in detail with reference to FIG. 11.

Figure 11:
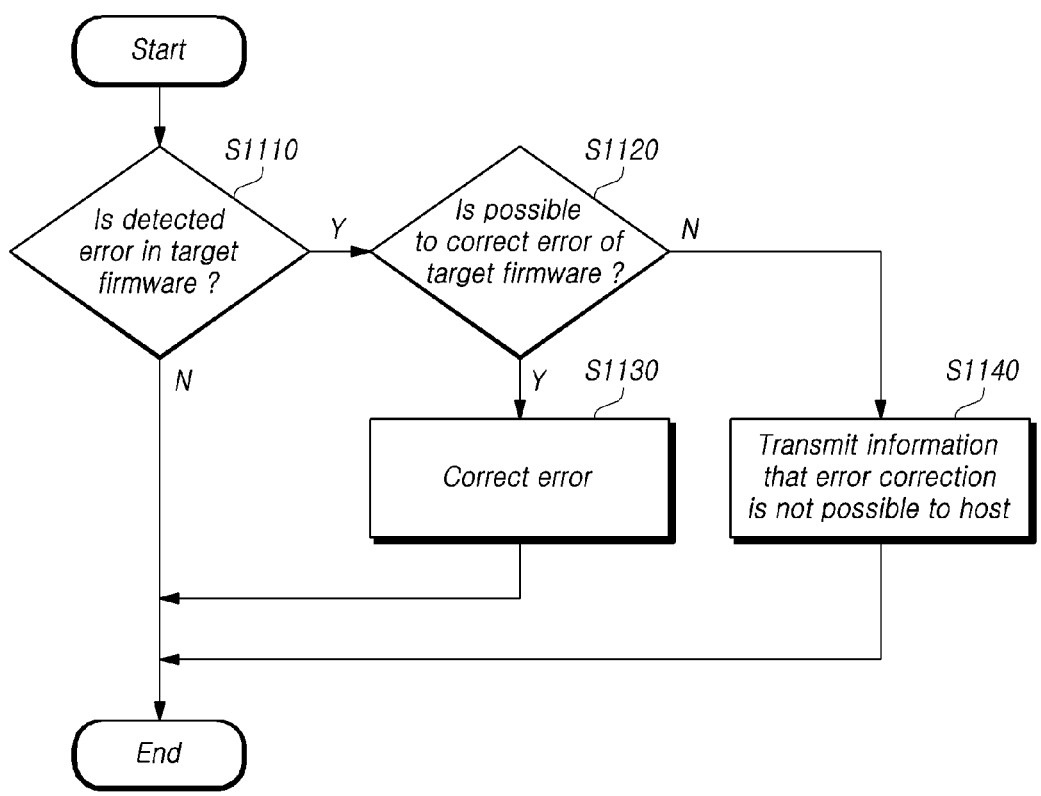
FIG. 11 is a flowchart illustrating an operation of detecting and correcting an error of a target firmware written to a buffer by a memory system according to embodiments of the present disclosure.

FIG. 11 is a flowchart illustrating an operation of detecting and correcting an error of a target firmware TAR_FW written to a buffer BUF by a memory system 100 according to embodiments of the present disclosure.

The memory controller 120 of the memory system 100 may detect whether an error has occurred in the target firmware TAR_FW written in the buffer BUF (S1110). If an error is not detected in the target firmware TAR_FW (S1110-N), the memory controller 120 may terminate the error detection and correction process.

If an error is detected in the target firmware TAR_FW (S1110-Y), the memory controller 120 may determine whether an error occurring in the target firmware TAR_FW can be corrected (S1120).

In the case that an error occurring in the target firmware TAR_FW can be corrected (S1120-Y), the memory controller 120 may correct the error (S1130). For example, since a single error can be corrected if a Hamming code is used, the memory controller 120 may correct the error if the occurred error is a single error.

On the other hand, if an error occurring in the target firmware TAR_FW cannot be corrected (S1120-N), the memory controller 120 may transmit information indicating that an error is detected but cannot be corrected to the host (S1140). For example, in the case that a Hamming code is used, a double error may be detected, but cannot be corrected. Accordingly, if a double error is detected, the memory controller 120 may transmit information indicating that error correction may not be feasible to the host.

When receiving information that error correction may not be feasible, the host may retry updating the target firmware TAR_FW.

Hereinafter, it will be described an operation of detecting and correcting an error by the memory system 100 according to embodiments of the present disclosure.

As an example, the memory controller 120 of the memory system 100 may compute or calculate a checksum of the target firmware TAR_FW written to the buffer BUF, write the checksum and the target firmware (TAR_FW) to the memory device 110, and compare the checksum of the target firmware TAR_FW written to the memory device 110 and the checksum of the target firmware TAR_FW written to the buffer so as to detect an error.

The memory system 100 may utilize a checksum to check an error occurring in the process of writing the target firmware TAR_FW to the memory device 110.

Checksum is a form of redundancy check, in which a checksum number is acquired by adding listed data, and a modulo-operation of a predetermined number of bits is performed. It is possible to protect the transmitted data from errors by obtaining the checksum of a certain number of bits.

Figure 12:
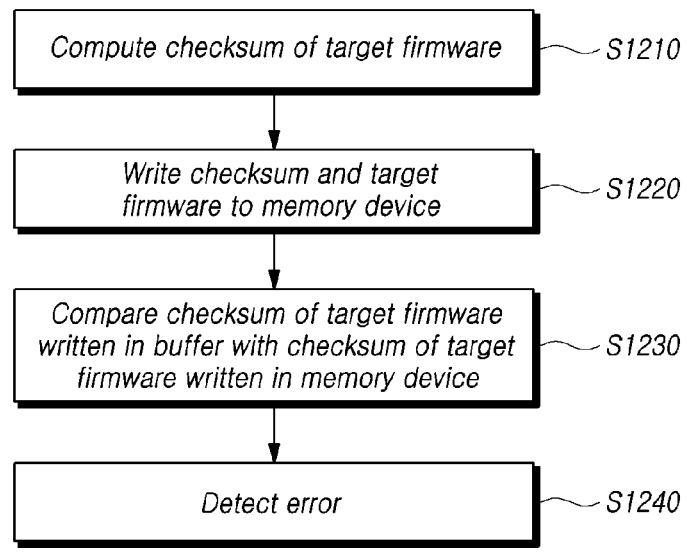
FIG. 12 is a flowchart illustrating an operation of detecting an error using a checksum by a memory system according to embodiments of the present disclosure.

FIG. 12 is a flowchart illustrating an operation of detecting an error using a checksum by a memory system 100 according to embodiments of the present disclosure.

Referring to FIG. 12, the memory controller 120 may compute or calculate a checksum of the target firmware TAR_FW stored in the buffer BUF (S1210).

The memory controller 120 may write the target firmware TAR_FW and the checksum to the memory device 110 (S1220).

The memory controller 120 may compare the checksum of the target firmware TAR_FW written to the buffer BUF with the checksum of the target firmware TAR_FW written to the memory device 110 (S1230).

If the two checksums are different from each other, the memory controller 120 may determine that an error has occurred in the memory device 110 (S1240).

In this case, the memory controller 120 may transmit information indicating that an error has occurred in the process of updating the target firmware TAR_FW to the host. In this case, the host may retry updating the target firmware TAR_FW.

As another example, the memory controller 120 of the memory system 100 may perform an error correction code encoding (ECC encoding) on the target firmware TAR_FW written to the buffer BUF, and may detect and correct an error by writing the error correction code-encoded target firmware TAR_FW to the memory device 110 and performing error correction code decoding on the error correction code-encoded target firmware TAR_FW.

The memory controller 120 may utilize an error detection code (EDC) and an error correction code (ECC) to detect and correct an error occurring in the memory device 110.

In the case that the memory controller 120 uses the error detection code and the error correction code, a cyclic redundancy check (CRC), a BHC code (Bose-Chaudhuri-Hocquenghem Code), or a LDPC code (Low-Density Parity-Check code), etc. can be used.

The cyclic redundancy check (CRC) is to check whether an error occurs in the data transmission process. Before data transmission, CRC parity is added according to the data and transmitted, and the occurrence of an error can be checked by comparing the received data with the CRC parity at the receiving side.

The BCH code is a linear traversal block code, and, in the case of the BCH code, the implementation method is less complicated. Encoding and decoding are relatively easy, and particularly efficient decoding is possible. The BCH code is a generalized/extended Hamming code capable of single error bit correction, which enables a multiple random error bit correction.

The LDPC code (Low-Density Parity-Check Code) is an error correction code that may not guarantee complete transmission, but can reduce the probability of information loss as much as desired. The LDPC code may have performance close to the Shannon limit, which is the theoretical limit of error-free communication. The LDPC code uses information accumulated through multiple read operations to determine the probability of each cell with a bit value of 1 or a bit value of 0. Accordingly, the LDCP code has a characteristic that a decoding latency is relatively long and an overhead is increased, but has an advantage of providing strong protection.

Meanwhile, the algorithm of the error correction code may be selected, modified, and applied according to protection strength, sector size, coding speed, and the like.

Figure 13:
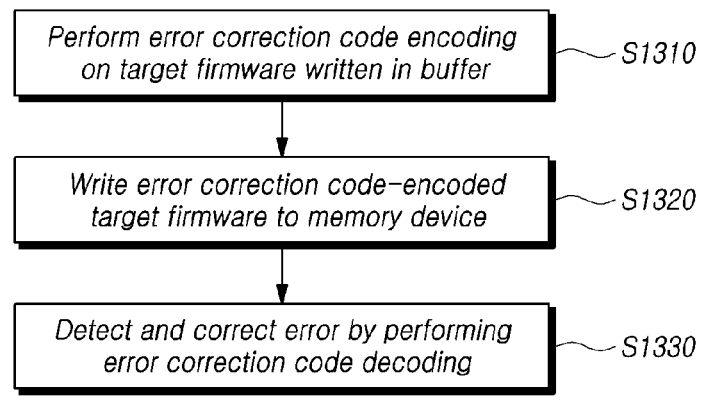
FIG. 13 is a flowchart illustrating an operation of detecting and correcting an error using an error correction code by a memory system according to embodiments of the present disclosure.

FIG. 13 is a flowchart illustrating an operation of detecting and correcting an error using an error correction code by a memory system 100 according to embodiments of the present disclosure.

Referring to FIG. 13, the memory controller 120 may perform encoding on the target firmware TAR_FW stored in the buffer BUF using the above-described error correction code (S1310).

The memory controller 120 may write the encoded target firmware TAR_FW to the memory device 110 (S1320).

The memory controller 120 may perform error correction code decoding with respect to the firmware TAR_FW written by error correction code encoding in the memory device 110, and may detect and correct an error generated in the memory device 110 during the error correction code decoding process (S1330).

The memory controller 120 may correct an error detected in the error correction code decoding process if it is possible to correct the error, and if it is not feasible to correct the error, transmit information indicating that error correction is not feasible to the host.

If the host receives information indicating that error correction is not feasible from the memory controller 120, the host may update the target firmware TAR_FW again.

Figure 14:
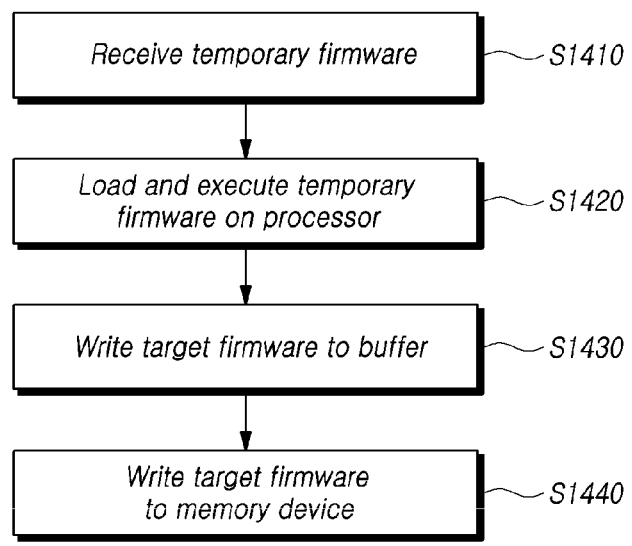
FIG. 14 is a flowchart illustrating an operating method of a memory system according to embodiments of the present disclosure.

FIG. 14 is a flowchart illustrating an operating method of a memory system 100 according to embodiments of the present disclosure.

Referring to FIG. 14, the operating method of a memory system 100 may include receiving, when updating a target firmware TAR_FW, a temporary firmware TEMP_FW for increasing the size of a buffer BUF for temporarily storing data to be written to the memory device 110 from a preset first size 1st_SIZE to a second size 2nd_SIZE greater than or equal to the size of a target firmware TAR_FW from a host (S1410).

In addition, the operating method of a memory system 100 may include loading and executing the temporary firmware TEMP_FW into the processor 124 included in the memory system 100 (S1420).

The operating method of a memory system 100 may include receiving the target firmware TAR_FW from the host and writing the target firmware TAR_FW to the buffer BUF (S1430).

The operating method of a memory system 100 may include writing the target firmware TAR_FW written in the buffer BUF to the memory device 110 (S1440).

Meanwhile, the target firmware TAR_FW written to the buffer BUF may be written to a firmware block FW_BLK, which is one of the plurality of memory blocks BLK included in the memory device 110.

In addition, the operating method of a memory system 100 may further include loading and executing the target firmware TAR_FW into the processor 124 and performing initialization of the memory system 100.

Meanwhile, the operating method of the memory system 100 may further include deleting the temporary firmware TEMP_FW when the target firmware TAR_FW is loaded into the processor 124 and executed.

Meanwhile, the operating method of the memory system 100 may further includes deleting data written to the buffer BUF and resetting the size of the buffer BUF from the second size 2nd_SIZE to the first size 1st_SIZE.

Meanwhile, the step S1440 of writing the target firmware TAR_FW to the memory device 110 may include, for example, detecting and correcting an error occurring in the target firmware TAR_FW.

For example, the step S1440 of writing the target firmware TAR_FW to the memory device 110 may further include computing a checksum for the target firmware TAR_FW written to the buffer BUF, writing the checksum and target firmware TAR_FW to the memory device 110, and detecting an error by comparing the checksum of the target firmware TAR_FW written in the memory device 110 with the checksum of the target firmware TAR_FW written in the buffer BUF.

As another example, the step S1440 of writing the target firmware TAR_FW to the memory device 110 may further include performing error correction code encoding on the target firmware TAR_FW written to the buffer BUF, writing the error correction code-encoded target firmware to the memory device 110, and detecting and correcting an error by performing error correction code decoding on the error correction code-encoded target firmware TAR_FW.

Figure 15:
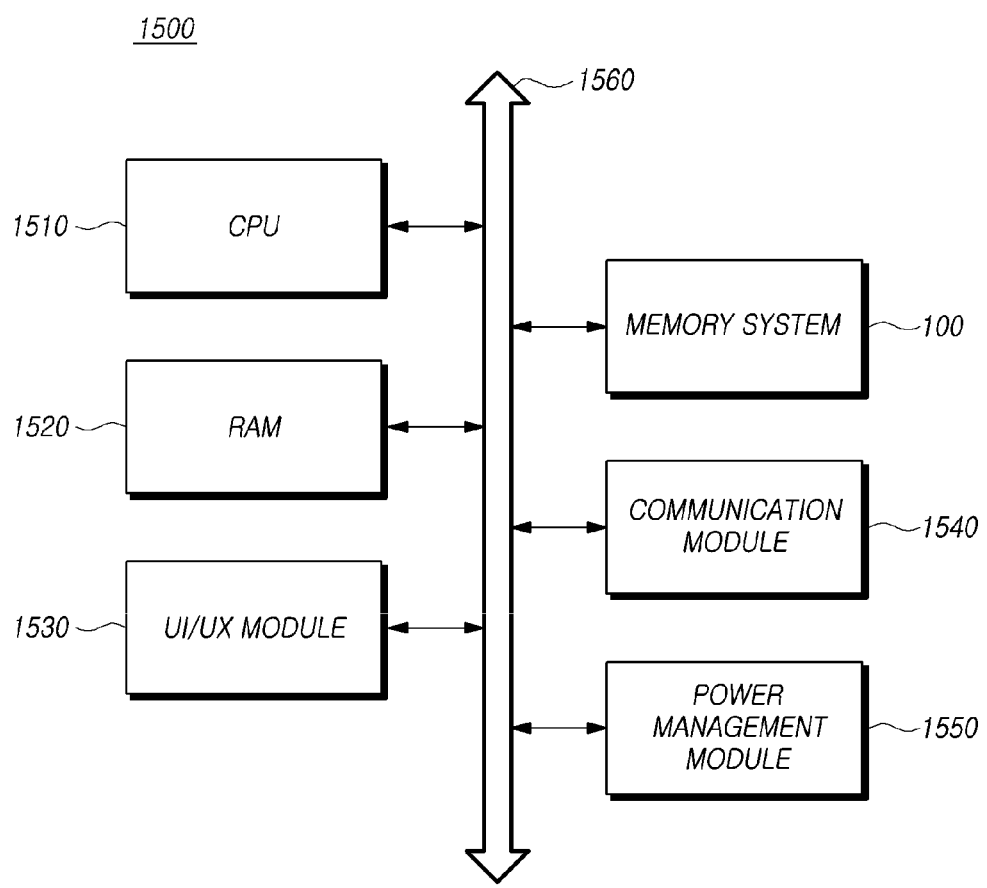
FIG. 15 illustrates the configuration of a computing system based on some embodiments of the disclosed technology.

FIG. 15 is a diagram illustrating the configuration of a computing system 1500 based on an embodiment of the disclosed technology.

Referring to FIG. 15, the computing system 1500 based on an embodiment of the disclosed technology may include: a memory system 100 electrically connected to a system bus 1560; a CPU 1510 configured to control the overall operation of the computing system 1500; a RAM 1520 configured to store data and information related to operations of the computing system 1500; a user interface/user experience (UI/UX) module 1530 configured to provide the user with a user environment; a communication module 1540 configured to communicate with an external device as a wired and/or wireless type; and a power management module 1550 configured to manage power used by the computing system 1500.

The computing system 1500 may be a personal computer (PC) or may include a mobile terminal such as a smartphone, a tablet or various electronic devices.

The computing system 1500 may further include a battery for supplying an operating voltage, and may further include an application chipset, a graphic-related module, a camera image processor, and a DRAM. Other elements would be obvious to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Based on embodiments of the disclosed technology described above, the operation delay time of the memory system may be advantageously reduced or minimized. In addition, based on an embodiment of the disclosed technology, an overhead occurring in the process of calling a specific function may be advantageously reduced or minimized. Although various embodiments of the disclosed technology have been described with particular specifics and varying details for illustrative purposes, those skilled in the art will appreciate that various modifications, additions and substitutions may be made based on what is disclosed or illustrated in this patent document.

What is claimed is:

1. A memory system comprising:
   a memory device including a plurality of memory blocks; and
   a memory controller, which controls the memory device and includes a buffer for temporarily storing data to be written to the memory device and a processor for executing a target firmware to control the memory device, the memory controller configured to:
   receive, when updating the target firmware, a temporary firmware to increase a size of the buffer from a preset first size to a second size equal to or greater than the size of the target firmware from a host,
   execute the temporary firmware with the processor,
   receive the target firmware from the host and write the target firmware to the buffer,
   write the target firmware from the buffer to the memory device, and
   delete the temporary firmware after increasing the size of the buffer.

2. The memory system of claim 1, wherein the memory controller is configured to write the target firmware to a firmware block which is one of a plurality of memory blocks in the memory device.

3. The memory system of claim 2, wherein the memory controller is configured to load the target firmware from the firmware block into the processor for execution to perform an initialization of the memory system.

4. The memory system of claim 3, wherein the memory controller is configured to delete the data written to the buffer, and reset the size of the buffer from the second size to the preset first size.

5. The memory system of claim 1, wherein the memory controller is configured to detect whether an error has occurred when writing the target firmware to the memory device and correct the error in response to detecting the error.

6. The memory system of claim 5, wherein the memory controller is configured to compute a checksum of the target firmware, write the checksum and the target firmware to the memory device, and detect the error by comparing a checksum of the target firmware written to the memory device with a checksum of the target firmware written to the buffer.

7. The memory system of claim 5, wherein the memory controller is configured to perform an error correction code encoding on the target firmware, write an error correction code-encoded target firmware to the memory device, and detect and correct the error by performing an error correction code decoding on the error correction code-encoded target firmware.

8. A method of operating a memory system including a memory device having a plurality of memory blocks comprising:
   receiving, when updating a target firmware, a temporary firmware to increase a size of a buffer for temporarily storing data to be written to the memory device from a preset first size to a second size equal to or greater than the size of the target firmware from a host,
   executing the temporary firmware with a processor included in the memory system,
   receiving the target firmware from the host and writing the target firmware to the buffer,
   writing the target firmware from the buffer to the memory device, and
   deleting the temporary firmware after increasing the size of the buffer.

9. The method of claim 8, wherein the target firmware is written to a firmware block which is one of the plurality of memory blocks in the memory device.

10. The method of operating the memory system of claim 8, further comprising:
    loading the target firmware into the processor for execution; and
    performing initialization of the memory system.

11. The method of claim 10, further comprising:
    deleting the data written to the buffer; and
    resetting the size of the buffer from the second size to the preset first size.

12. The method of claim 8, wherein writing the target firmware to the memory device comprises detecting whether an error occurred in the target firmware and correcting the error in response to detecting the error in the target firmware.

13. The method of claim 12, wherein writing the target firmware to the memory device comprises:
    computing a checksum for the target firmware;
    writing the checksum and the target firmware to the memory device; and
    detecting the error by comparing a checksum of the target firmware written in the memory device with a checksum of the target firmware written in the buffer.

14. The method of claim 12, wherein writing the target firmware to the memory device comprises:
    performing an error correction code encoding on the target firmware;
    writing an error correction code-encoded target firmware to the memory device; and
    detecting and correcting the error by performing an error correction code decoding on the error correction code-encoded target firmware.

15. A memory controller comprising:
    a buffer for temporarily storing data to be written to a memory device; and
    a processor for executing a target firmware to control the memory device,
    wherein the memory controller is configured to:
    receive a target firmware update from a host;

store the target firmware update in the buffer;
delete a temporary firmware, which increases a size of the buffer from a preset first size to a second size equal to or greater than the size of the target firmware, after increasing the size of the buffer; and
perform error detection on the target firmware update.

16. The memory controller of claim 15, wherein the memory controller is configured to send information to the host indicating that an uncorrectable error has occurred when an uncorrectable error is detected on the target firmware update.

* * * * *